(12) United States Patent
Krishnamurthy

(10) Patent No.: US 7,149,224 B1
(45) Date of Patent: Dec. 12, 2006

(54) METHOD OF POINT-TO-POINT PROTOCOL NEGOTIATION

(75) Inventor: Ramesh Krishnamurthy, Burlington, NC (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 10/044,665

(22) Filed: Oct. 23, 2001

(51) Int. Cl.
*H04L 12/28* (2006.01)
*H04J 3/16* (2006.01)

(52) U.S. Cl. .................... 370/401; 370/465
(58) Field of Classification Search ............. None
See application file for complete search history.

(56) References Cited

U.S. PATENT DOCUMENTS

| | | | |
|---|---|---|---|
| 6,359,894 B1 * | 3/2002 | Hong et al. ............... | 370/402 |
| 6,477,150 B1 * | 11/2002 | Maggenti et al. .......... | 370/312 |
| 6,819,681 B1 * | 11/2004 | Hariharasubrahmanian . | 370/498 |
| 2002/0097707 A1 * | 7/2002 | Balazinzki et al. ........ | 370/351 |

OTHER PUBLICATIONS

M. Latvala, et al., Point-to-Point Protocol Extension Group—Internet Draft, "Semi Connected Mode for PPP Links," Mar. 13, 1997, pp. 1-15.

W. Simpson, Network Group—RFC 1661, "The Point-to-Point Protocol (PPP)," Jul. 1994, pp. 1-52.

James Carlson, *PP Design, Implementation, and Debugging*, Second Edition, Copyright © 2000 by Addison-Wesley, pp. 125-126.

* cited by examiner

*Primary Examiner*—Chau Nguyen
*Assistant Examiner*—Cynthia L. Davis
(74) *Attorney, Agent, or Firm*—Campbell Stephenson Ascolese LLP

(57) ABSTRACT

The present invention defines a method to optimize PPP negotiations during a data communication session between two peer network elements in a network. During the configuration cycle of a PPP negotiation, the responding network element uses the option values of the first configuration request packet sent by the sending network element to predict the option values of the next configuration request packet that the sending network element will send. The responding network element then generates a response packet based on the predicted option values. The responding network element forwards the response packet before the next request packet is received from the sending network element. Once the response packets are forwarded, the internal states of the responding network element are set appropriately to initiate communication for the next protocol level.

76 Claims, 8 Drawing Sheets

METHOD OF POINT-TO-POINT PROTOCOL NEGOTIATION

BACKGROUND OF THE INVENTION

1. Field of the Invention

This invention relates to the field of communication protocols used to route information in a network, specifically to a method and apparatus for performing Point-to-Point Protocol negotiation efficiently.

2. Description of the Related Art

The Point-to-Point Protocol (PPP) is a data link protocol used by network routers to negotiate configuration parameters for a communication session (i.e., e.g., a particular type of network layer protocol, authentication parameters or the like). Typically, when a first router initiates a connection to establish a session with a second router in the network, the first router does not know the type of network layer protocol and other session configuration parameters supported by the second router. The first router uses PPP to negotiate configuration options for the session with the second router.

Generally, PPP carries information in the fields of standard data link protocol frames, for example, the 'I' field of high-level data link control (HDLC) protocol frame. The current implementation of PPP consists of two procedures, Link Control Protocol (LCP) and Network Control Protocol (NCP). LCP is used to configure the links (e.g., establishing authentication). NCP is used to negotiate options and parameters that will be used by layer-three network protocol (i.e., e.g., compression, IP addresses and the like). PPP encapsulates network layer protocol data unit (PDU) and carries the PDU in the 'I' field of HDLC type frame. PPP negotiation can include several negotiation cycles before the options for a connection are configured. These negotiation cycles can be a significant user perceived delays especially, in the case of a slow link (e.g., cell phone data connection) the round trip packet time can be over 600–800 ms. The negotiation time can be a significant percentage of the total time a user stays connected in slow link connections.

FIG. 1 illustrates an example of current implementation of PPP negotiations in a network 100. Network 100 includes two routers, routers 110 and 120. Routers 110 and 120 are coupled via a link 105. Router 110 initiates a session with router 120. Initially, router 110 assembles a configuration request packet 130 that will be sent to router 120. Configuration request packet 130 includes a packet ID 111 and session related options, OPT-1, OPT-2, OPT-3 and OPT-4. These options can define various sessions related parameters (i.e., e.g., packet size, authentication or the like). For illustration purposes, the values of session related options for OPT-1 is A, for OPT-2 is B, for OPT-3 is C and for OPT-4 is D. Similarly, router 120 establishes configurations with router 110. Router 120 assembles a configuration request packet 140 that will be sent to router 110. Configuration request packet 140 includes a packet ID 121 and session related options, OPT-1, OPT-2 and OPT-3. These options can define various sessions related parameters (i.e., e.g., packet size, authentication or the like). For illustration purposes, the values of session related options for OPT-1 is X, for OPT-2 is Y and for OPT-3 is Z.

Router 110 sends configuration request packet 130 to router 120 and router 120 sends configuration request packet 140 to router 110. Router 110 receives configuration request packet 140 and determines that the requested options in configuration request packet 140 are acceptable and assembles a configuration-ACK packet 150. Configuration-ACK packet 150 includes the packet ID of configuration request packet 140, packet ID 121, and an ACK for options OPT-1, OPT-2 and OPT-3. Router 110 sends configuration-ACK packet 150 to router 120. Upon receiving configuration request packet 130, router 120 determines that option OPT-1 is not a supported option and assembles a configuration reject packet 160. Configuration reject packet 160 identifies the packet ID of configuration request packet 130, packet ID 111, and the option that is rejected, OPT-1. Router 120 sends configuration reject packet 160 to router 110.

Upon receiving configuration-reject packet 160, router 110 assembles another configuration request packet 170. Configuration request packet 170 includes a packet ID 112 and remaining options, OPT-2, OPT-3 and OPT-4. When router 120 receives configuration request packet 170, router 120 determines that the value of OPT-3 is not acceptable. Router 120 assembles a configuration-NAK packet 180. A configuration-NAK packet is used to indicate that an option is accepted, but that the value of the option is not supported by the router receiving the request (e.g., router 120). Configuration-NAK packet 180 includes the packet ID of configuration request packet 150 (packet ID 112) and NAK for OPT-3 with a suggested value 'E' for OPT-3. Router 120 sends configuration-NAK packet 180 to router 110.

When router 110 receives configuration-NAK packet 180, router 110 assembles a configuration request packet 190 with a packet ID 113 and value 'E' for OPT-3. Router 110 then sends configuration request packet 190 to router 120. Router 120 receives configuration request packet 190 and determines that the requested options in configuration request packet 190 are acceptable and assembles a configuration-ACK packet 195. Configuration-ACK packet 195 includes the packet ID of configuration request packet 190, packet ID 113, and an ACK for options OPT-2, OPT-3 and OPT-4. Router 120 sends configuration-ACK packet 195 to router 110. The PPP negotiation ends and the next layer of protocol proceeds with communication session. When router 110 does not accept the options in configuration request packet 140, router 110 follows similar process of negotiation to establish acceptable session parameters for router 120.

During PPP negotiations, each configuration packet travels through link 105 at a speed allowable by the available bandwidth of link 105. In slow link connections (e.g., cell phone data connection), the user information carried at the network layer during a session is often carried in fewer packets than the number of packets used to negotiate the session. A method and apparatus that reduces the time required for the negotiation of a PPP connection is therefore needed.

SUMMARY

The present invention describes a method of negotiating point-to-point protocol (PPP). The method includes receiving a first configuration request packet at a first network element for a network connection from a second network element, responding with a first packet, and if a first response to the first packet is expected by the first network element, determining expected contents of the first response, and if the expected contents of the first response to the first packet require a response, responding with a second packet before receiving the first response. The method further includes sending a second configuration packet to the second network element. The method further includes if the first configuration request packet includes at least one unsupported option, responding with a configuration reject packet. If the first configuration request packet includes at least one supported option having at least one unsupported value, responding with at least one configuration-NAK packet for the supported option having at least one unsupported value. In one embodiment of the present invention, the configuration-NAK packet includes at least one suggested supported value for the supported option having at least one unsupported value.

The method further includes responding with a first configuration-ACK packet having the supported option with the suggested supported value before receiving a response to the configuration-NAK packet, and starting a re-send timer. In one embodiment of the present invention, a value of the re-send timer is dynamically determined according to a network traffic condition. The method further includes setting a state of the network connection to 'ACK-sent' after sending the first configuration-ACK packet. In one embodiment of the present invention, the method further includes setting the state of the network connection to 'open' after sending the first configuration-ACK packet. The method further includes if the re-send timer expires before a response to the second configuration request packet is received, re-sending the first configuration-ACK packet, restarting the re-send timer, and repeating the steps of re-sending and restarting until the response to the second configuration request packet is received.

The method further includes if the response to the second configuration request packet is received, analyzing the response to the second configuration request packet. The method further includes if the response to the second configuration request packet is a second configuration-ACK packet, setting the state of the network connection to 'open' and discarding any further responses. The method further includes if the response to the second configuration request packet is not the second configuration-ACK packet, resetting the state of the network connection, and initiating conventional PPP negotiation. The method further includes if the re-send timer expires before the response to the second configuration request packet is received, re-sending the first configuration-ACK packet, resetting the state of the network connection to 'ACK-sent', restarting the re-send timer, and repeating the steps of re-sending and restarting until the response to the second configuration request packet is received.

The method further includes if the response to the second configuration request packet is received, analyzing the response to the second configuration request packet. The method further includes if the response to the second configuration request packet is the second configuration-ACK packet, determining the state of the network connection, and if the state of the network connection is not set to 'open', setting the state of the network connection to 'open'. The method Her includes discarding any further responses. The method further includes if the response to the second configuration request packet is not the second configuration-ACK packet, resetting the state of the network connection.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention defines a method to optimize PPP negotiations during a data communication session between two peer network elements in a network. During the configuration cycle of a PPP negotiation, the responding network element uses the option values of the first configuration request packet sent by the sending network element to predict the option values of the next configuration request packet that the sending network element will send. The responding network element then generates a response packet based on the predicted option values. The responding network element forwards the response packet before the next request packet is received from the sending network element. Once the response packets are forwarded, the internal states of the responding network element are set appropriately to initiate communication for the next protocol level.

If the request packet (for which the response packet was previously forwarded) contains values matching the response packet previously sent, the responding network element discards the request packet. If the request packet (for which the response packet was previously forwarded) contains values do not match the response packet previously sent, the responding network element resorts to conventional PPP negotiations.

Optimized PPP Negotiation Packet Flow

Figure 1:
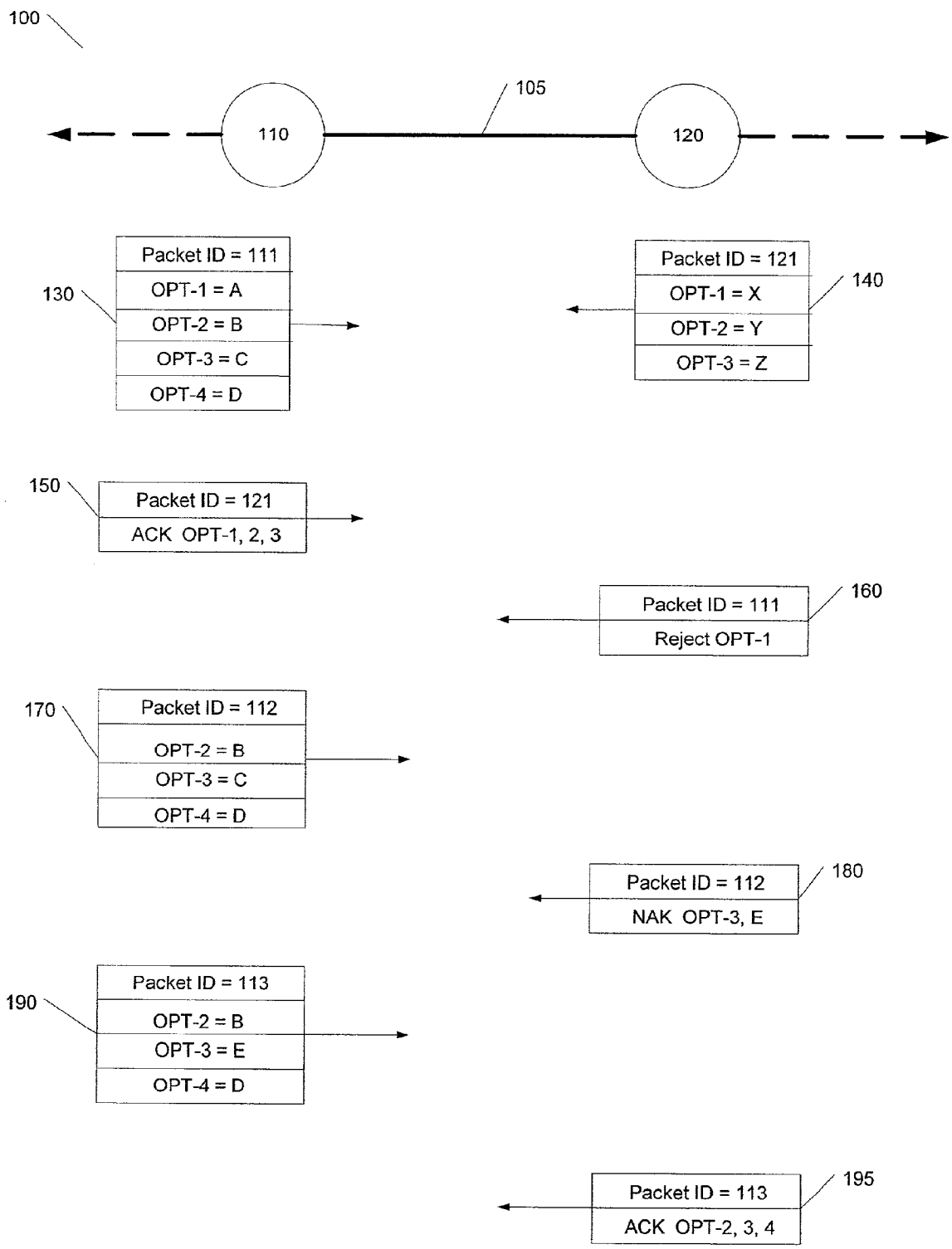
FIG. 1 illustrates an example of current implementation of PPP negotiations in a network.
Figure 2:
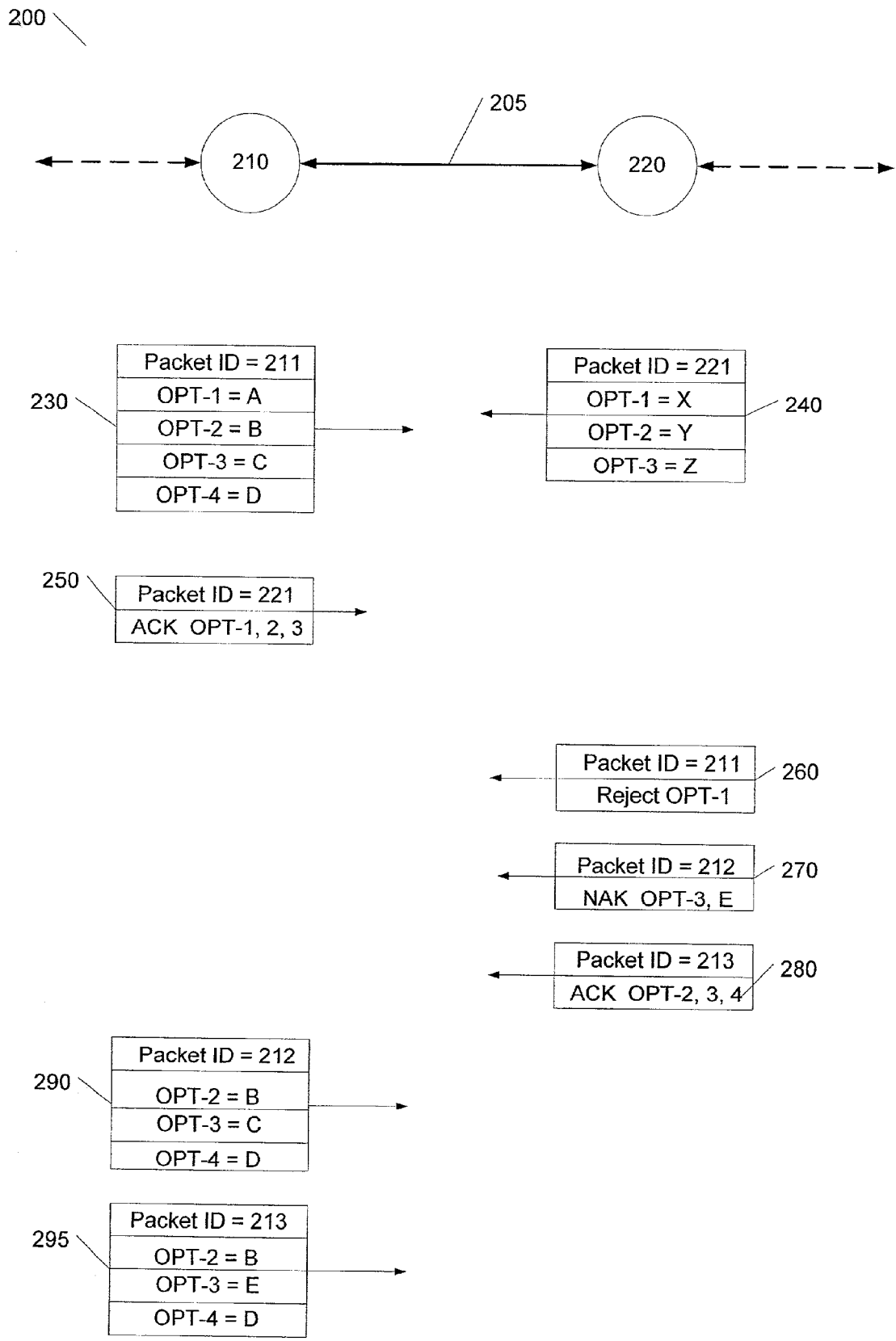
FIG. 2 illustrates an example of packet flow during an optimized PPP negotiation between two peer network elements in a network according an embodiment of the present invention.

FIG. 2 illustrates an example of packet flow during an optimized PPP negotiation between two peer network elements in a network 200 according to an embodiment of the present invention. Network 200 includes two routers, routers 210 and 220. Routers 210 and 220 are coupled via a link 205. Router 210 initiates a session with router 220. Initially, router 210 assembles a configuration request packet 230 that is destined for router 220. Configuration request packet 230 includes a packet ID 211 and session related options, OPT-1, OPT-2, OPT-3 and OPT-4. These options can define various sessions related parameters (i.e., e.g., packet size, authentication or the like). For illustration purposes, the values of session related options are as follows: OPT-1 is A, OPT-2 is B, for OPT-3 is C and OPT-4 is D. Similarly, router 220 establishes configurations with router 210. Router 220 assembles a configuration request packet 240 that will be sent to router 210. Configuration request packet 240 includes a packet ID 221 and session related options, OPT-1, OPT-2 and OPT-3. These options can define various sessions related parameters (i.e., e.g., packet size, authentication or the like). For illustration purposes, the values of session related options for OPT-1 is X, for OPT-2 is Y and for OPT-3 is Z.

Router 210 sends configuration request packet 230 to router 220 and router 220 independently sends configuration request packet 240 to router 210. Router 210 receives configuration request packet 240 and determines that the requested options in configuration request packet 240 are acceptable and assembles a configuration-ACK packet 250. Configuration-ACK packet 250 includes the packet ID of configuration request packet 240, packet ID 221, and an ACK for options OPT-1, OPT-2 and OPT-3. Router 210 sends configuration-ACK packet 250 to router 220. Upon receiving configuration request packet 230, router 220 determines that option OPT-1 is not a supported option and assembles a configuration reject packet 260. Configuration reject packet 260 identifies the packet ID of configuration request packet 230 (packet ID 211) and the option that is rejected, OPT-1. Router 220 then sends configuration reject packet 260 to router 210.

Conventionally, router 220 waits for the next configuration packet from router 210. However, according to an embodiment of the present invention, router 220 determines that the value 'C' for option OPT-3 is not acceptable and options OPT-2 and OPT-4 are acceptable. Further router 220 then predicts that the next configure request packet from router 210 will include current value 'C' for OPT-3. Thus, router 220 assembles a configuration-NAK packet 270. Configuration-NAK packet 270 includes a packet ID 212 of the configuration request packet expected next. In the present example, router 220 assumes that the packet ID of next configuration request packet will be packet ID 212. The assumption regarding the packet IDs can be made based on various methods (e.g., methods used: a fixed incremental value predetermined by the network administrator, a knowledge base developed by a router during a topology update or the like).

In this example, router 220 supports a value 'E' for OPT-3. Router 220 includes the value 'E' for OPT-3 in configuration-NAK packet 270 as a suggestion to router 210. Next, router 220 predicts that after receiving configuration-NAK packet 270, router 210 will send a configuration request packet with acceptable options, OPT-2, OPT-3 with value 'E' and OPT-4. Thus, router 220 assembles a configuration-ACK packet 280. Configuration-ACK packet 280 includes an assumed packet ID, packet ID 213, of next expected acceptable configuration request packet. Configuration-ACK packet 280 further includes confirmation for options OPT-2, OPT-3 with value 'E' and OPT-4. Router 220 sends configuration-NAK packet 270 and configuration-ACK packet 280 to router 210. Router 220 sets the internal state of the connection to 'ACK-sent'. In another embodiment of the present invention, router 220 sets the internal state of the connection to 'open' after sending configuration-ACK packet 280 to initiate the next level protocol processing.

Router 210 receives configuration reject packet 260, configuration-NAK packet 270 and configuration-ACK packet 280. To conform to the current PPP protocol, router 210 also assembles a configure request packet 290 with a packet ID 212 and options OPT-2, OPT-3 with original value 'C' and OPT-4. Router 210 sends configuration packet 290 to conform to configuration-NAK packet 270 sent by router 220. Router 210 also assembles a configure request packet 295 with a packet ID 213 and options OPT-2, OPT-3 with suggested value 'E' and OPT-4. Router 210 sends configuration request packet 295 to router 220. Configuration request packets 290 and 295 are sent to conform to current implementation of PPP. When router 220 receives configuration request packets 290 and 295, router 220 discards the packets and no further action is taken. The increase in efficiency of PPP negotiations depends upon the number of configuration packets exchanged between two peers in a network. Typically, more packets are exchanged between two peers in the network to establish and confirm a connection. In the present example, router 220 eliminates the waiting time for two packets, configure-request packets 290 and 295 and begins the next level protocol processing after sending configure-ACK packet 280.

Error Recovery

Figure 3:
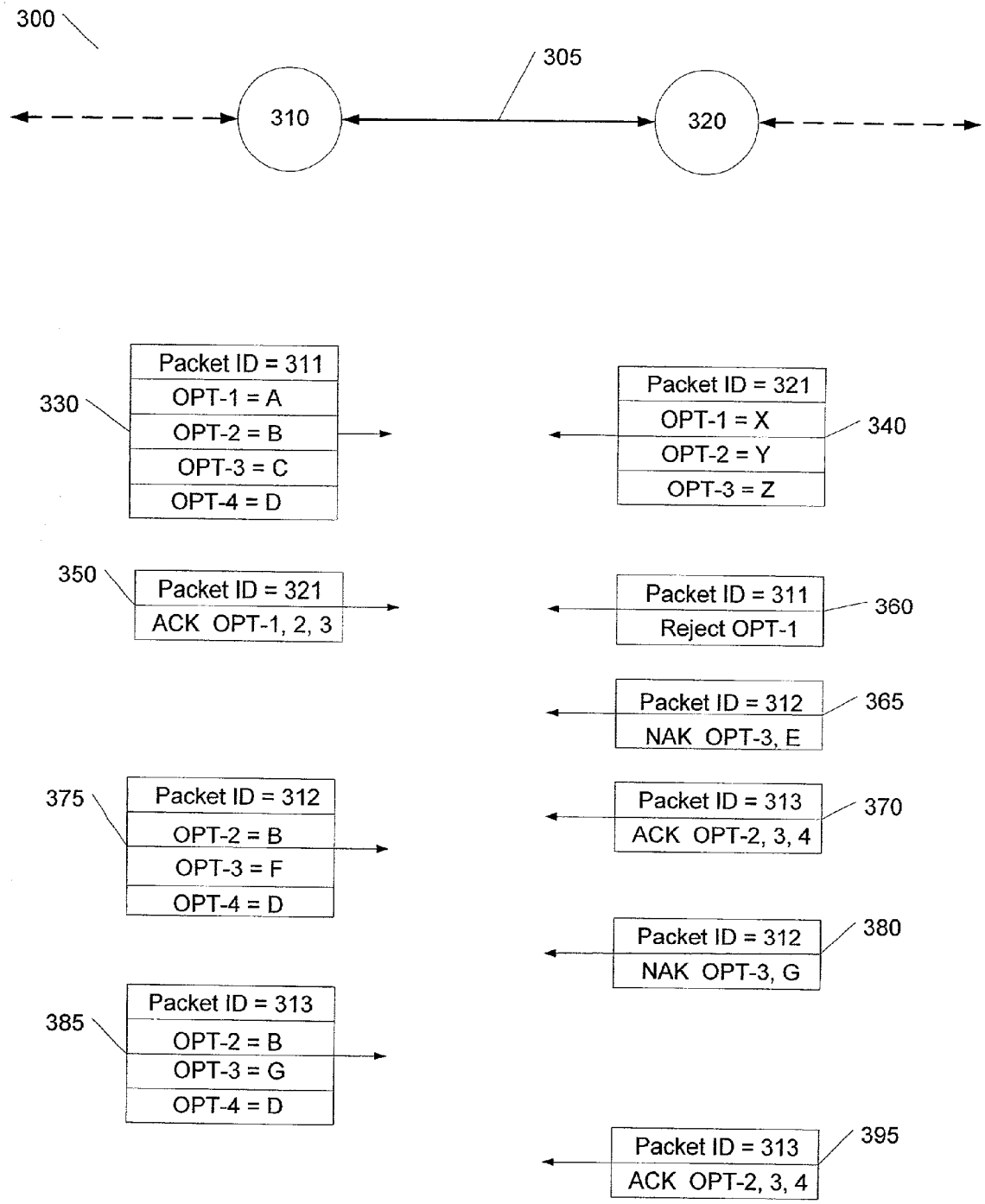
FIG. 3 illustrates an example of error recovery during optimized PPP negotiations between two network elements in a network according to an embodiment of the present invention.

FIG. 3 illustrates an example of error recovery during optimized PPP negotiations between two network elements in a network 300 according to an embodiment of the present invention. Network 300 includes two routers, routers 310 and 320. Routers 310 and 320 are coupled via a link 305. The interaction between routers 310 and 320 begins with router 310 initiating a session with router 320. Initially, router 310 assembles a configuration request packet 330 destined for router 320. Configuration request packet 330 includes a packet ID 311 and session related options, OPT-1, OPT-2, OPT-3 and OPT-4. These options can define various sessions related parameters (i.e., e.g., packet size, authentication or the like). For purposes of illustration, the values of session related options are as follows: OPT-1 is A, OPT-2 is B, OPT-3 is C and OPT-4 is D. Router 310 sends configuration request packet 330 to router 320. Similarly, router 320 establishes configurations with router 310. Router 320 assembles a configuration request packet 340 that will be sent to router 310. Configuration request packet 340 includes a packet ID 321 and session related options, OPT-1, OPT-2 and OPT-3. These options can define various sessions related parameters (i.e., e.g., packet size, authentication or the like). For illustration purposes, the values of session related options for OPT-1 is X, for OPT-2 is Y and for OPT-3 is Z.

Router 310 sends configuration request packet 330 to router 320 and router 320 independently sends configuration request packet 340 to router 310. Router 310 receives configuration request packet 340 and determines that the requested options in configuration request packet 340 are acceptable and assembles a configuration-ACK packet 350. Configuration-ACK packet 350 includes the packet ID of configuration request packet 340, packet ID 321, and an ACK for options OPT-1, OPT-2 and OPT-3. Router 310 sends configuration-ACK packet 350 to router 320. Upon receiving configuration request packet 330, router 320 determines that option OPT-1 is not a supported option and assembles a configuration reject packet 360. Configuration reject packet 360 identifies the packet ID of configuration request packet 330, packet ID 311, and the option that is rejected here, OPT-1. Router 320 then sends configuration reject packet 360 to router 310.

Router 320 further determines that OPT-3 is acceptable. However, the value for option OPT-3 is not acceptable although the options OPT-2 and OPT-4 are acceptable. Router 320 predicts that the next configure request packet from router 310 will include current value for OPT-3. Thus, router 320 assembles a configuration-NAK packet 365. Router 320 supports a value 'E' for OPT-3. In this example, router 320 assumes that the packet ID of next configuration request packet will be packet ID 312 thus, router 320 includes a packet ID 312 in configuration-NAK packet 365. Configuration-NAK packet 365 further includes a NAK for OPT-3 and suggested value 'E' for OPT-3. Next, router 320 predicts that after receiving configuration-NAK packet 350, router 310 will send a configuration request packet with acceptable values (OPT-2, OPT-3 with value 'E' and OPT-4). Thus, router 320 assembles a configuration-ACK packet 370. Configuration-ACK packet 376 includes assumed packet ID, packet ID 313, of expected acceptable configuration request packet. Configuration-ACK packet 370 further includes an ACK for options OPT-2, OPT-3 and OPT-4. Router 320 sends configuration-NAK packet 365 and configuration-ACK packet 370 to router 310. After sending configuration-ACK packet 370 to router 310, router 320 sets the internal state of the requested session to 'ACK-sent'.

In the present example, router 310 does not support value 'E' for OPT-3. However, router 310 supports a value 'F' for OPT-3. Router 310 assembles a configuration request packet 375. Configuration request packet 375 includes a packet ID 312 and session related options, OPT-2, OPT-3 with a new value 'F' and OPT4. Router 310 then sends configuration request packet 375 to router 320. When router 320 receives configuration packet 375, router 320 determines that configuration packet 375 is not what router 320 expected to receive. According to one embodiment of the present invention, in case of an error during PPP negotiations, the negotiations are conducted according to the conventional PPP.

Router 320 resets the internal state of requested connection, terminates the optimized PPP negotiation process and begins a conventional PPP negotiation process. Router 320 does not support a value of 'F' for OPT-3. However, router 320 supports a value 'G' for OPT-3. Router 320 assembles a configure-NAK packet 380 with a packet ID of 312 and a NAK for OPT-3 with a suggested value of 'G' for OPT-3. Router 320 then sends configure-NAK packet 380 to router 310.

When router 310 receives configure-NAK packet 380, router 310 determines that value 'G' for OPT-3 is supported and assembles a configure request packet 385 with a packet ID of 313 and options OPT-2, OPT-3 with suggested value of 'G' and OPT-4. Router 310 then sends configure request packet 385 to router 320. When router 320 receives configure request packet 385, router 320 determines that the requested options in configure request packet 385 can be supported and assembles a configure-ACK packet 395 accepting requested options. Router 320 sends configure-ACK packet 395 to router 310 and resets the internal state for the session to 'ACK-sent'.

Conventionally, after sending configuration-ACK packet 370, router 320 starts a re-send timer which is terminated when a response to the configuration-ACK is received and the internal state of the connection is set to 'open'. The re-send timer monitors the time elapsed after sending the configuration-ACK packet. The threshold for the re-send timer is set according to the PPP protocol recommendations. In one embodiment of the present invention, to further optimize the PPP negotiation and initiate the next protocol level processing after sending configuration-ACK packet 370, router 320 sets the internal state of the connection to 'open'. Setting the internal state to 'open' initiates the next protocol level processing. However, router 320 does not terminate the re-send timer. When the re-send timer expires or router 320 receives a response from router 310 that does not conform to configuration-ACK packet 360, router 320 terminates the optimization process, resets the internal connection states to previous value and proceeds with the conventional PPP negotiation.

Figure 4:
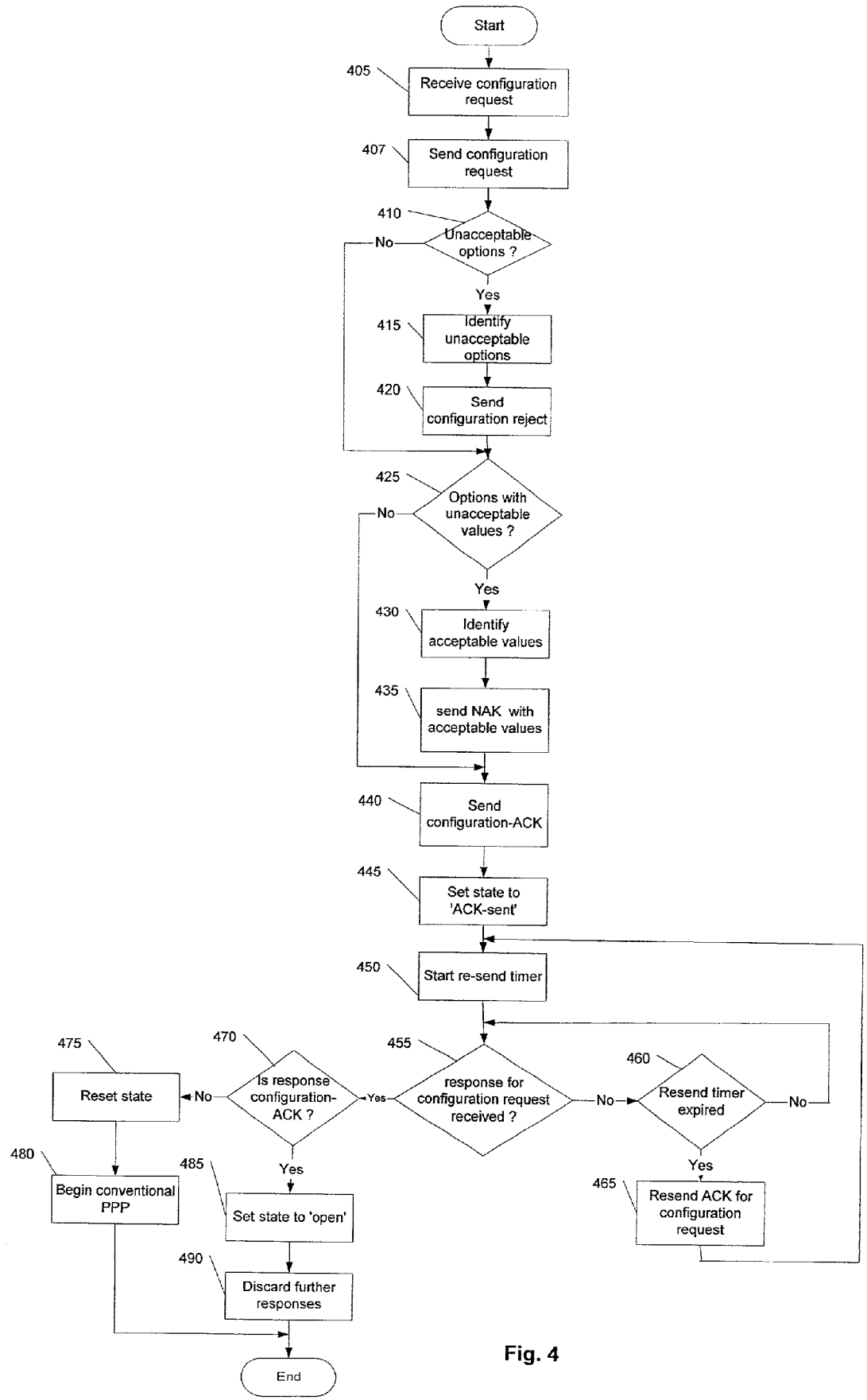
FIG. 4 is a flow diagram of steps performed by a router during optimized PPP negotiation according to an embodiment of the present invention.

FIG. 4 is a flow diagram of actions performed by a router during optimized PPP negotiation according to an embodiment of the present invention. Initially, the router receives a configuration request packet from a peer in the network (step 405). The router then sends a configuration request packet to the peer (step 407). The router determines whether the configuration request packet includes unacceptable options. (step 410). If one or more of the options in the configuration request packet are unacceptable, the router identifies the unacceptable options in the configuration request packet (step 415). The router sends a configuration reject packet for the identified unacceptable options (step 420). If the configuration request packet does not include unacceptable rejectable options, the router proceeds check unacceptable values (step 425).

The router then determines whether one or more of the acceptable options in the configuration request packet include unacceptable values (step 425). If the options in the configuration request packet are acceptable (i.e. e.g., options with values that are supported by the router or the like), the router proceeds by sending configuration-ACK packet to the peer (step 440). If one or more of the options in the configuration request packet include unacceptable values, the router identifies the acceptable values for the options (step 430). The router then sends a configuration-NAK packet including acceptable values as a suggestion to the peer (step 435).

Next, the router sends a configuration-ACK packet for next expected configuration request packet (step 440). The router sets the internal state of the connection to 'ACK-sent' (step 445) and starts a re-send timer (step 450). The router waits for a response for the configuration-ACK packet and determines whether the response is received (step 455). If the response to the configuration-ACK packet is not received, the router then determines whether the re-send timer has expired (step 460). If the re-send timer has not expired, the router continues to wait for the response to the configuration request packet (step 455). If the re-send timer has expired, the router re-sends the configuration-ACK packet (step 465) and restarts the re-send timer (step 450).

When the response to the configuration-ACK packet is received, the router determines whether the response is also a configuration-ACK packet (step 470). If the response is not a configuration-ACK packet, the router resets the internal state of the connection (step 475). The router terminates the optimization process and begins conventional PPP negotiations (step 480). If the response is a configuration-ACK packet, the router sets the internal state of the connection to 'open' (step 485). The router subsequently discards any further responses received from the peer (step 490).

Figure 5:
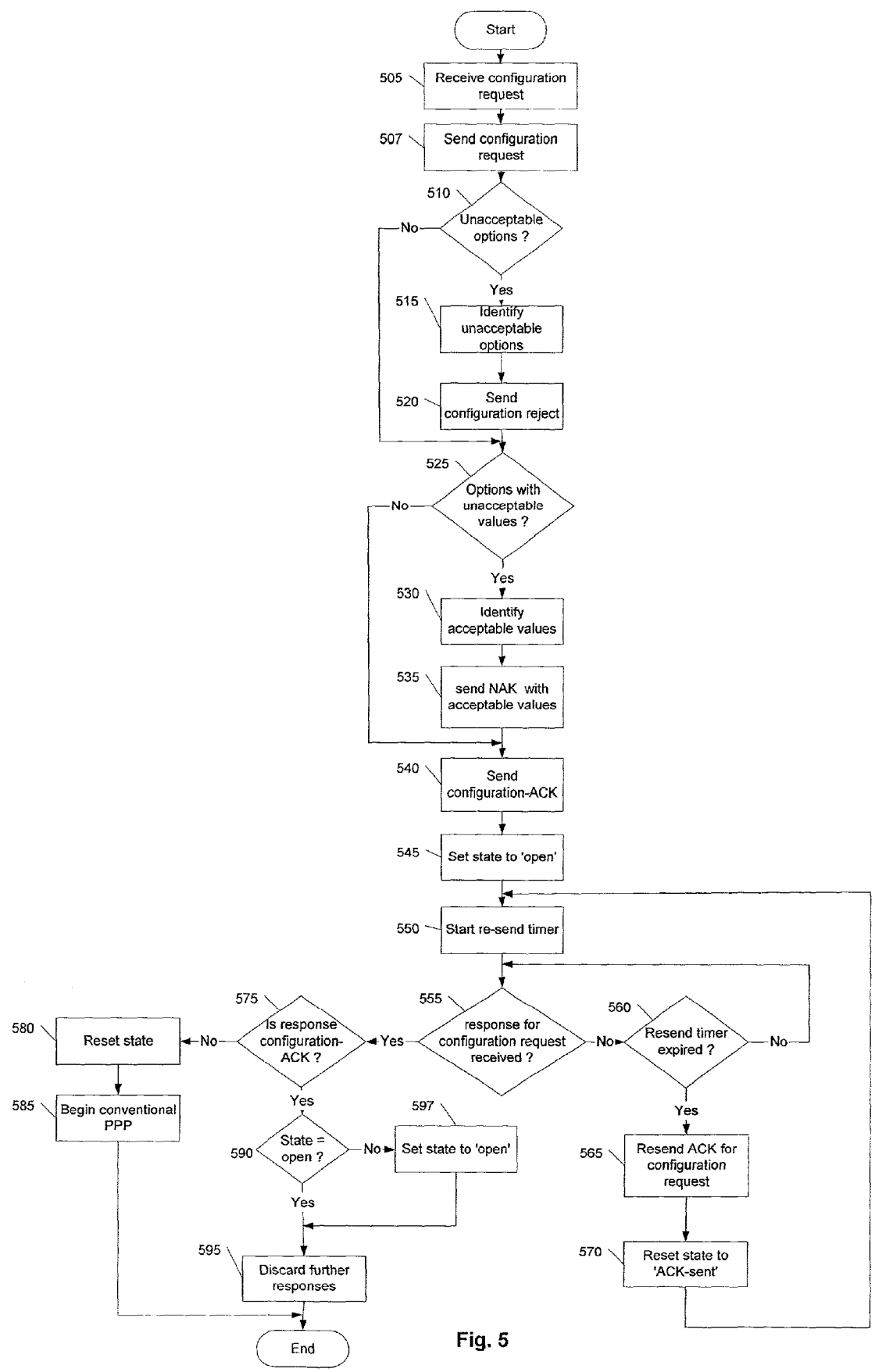
FIG. 5 is a flow diagram of steps performed by a router during optimized PPP negotiation according to one embodiment of the present invention.

FIG. 5 is a flow diagram of the actions performed by a router during optimized PPP negotiation according to one embodiment of the present invention. Initially, the router receives a configuration request packet from a peer in the network (step 505). The router then sends a configuration request packet to the peer (step 507). The router determines whether the configuration request packet includes unacceptable options (step 510). If the configuration request packet includes unacceptable options, the router proceeds to send a configuration reject packet (step 520). If one or more of the options in the configuration request packet are unacceptable, the router identifies the unacceptable options in the configuration request packet (step 515). The router sends a configuration reject packet for the identified options (step 520). The router determines whether the acceptable options in the configuration request packet include unacceptable values (step 525). If the acceptable options in the configuration request packet do not include unacceptable values, the router proceeds to send a configuration-ACK packet to the peer (step 540). If the options in the configuration request packet include unacceptable values, the router identifies the acceptable values for the options (step 530). The router sends a configuration-NAK packet acceptable values as a suggestion to the peer (step 535). The router then sends a configuration-ACK packet for next expected configuration request packet (step 540).

To initiate processing at the next protocol level, the router sets the internal state of the connection to 'open' (step 545) and starts a re-send timer (step 550). The router then waits for a response for the configuration-ACK packet and determines whether a response is received (step 555). If a response to the configuration-ACK is not received, the router determines whether the re-send timer is expired (step 560). If the re-send timer is not expired, the router continues to wait for the response to the configuration request packet (step 555). If the re-send timer is expired, the router sends another configuration-ACK packet (step 565). The router resets the internal state of the connection to 'ACK-sent' and the next protocol level processing is terminated (step 570). The router then starts the re-send timer (step 550). If a response to the configuration-ACK packet is received, the router determines whether the response is also a configuration-ACK packet (step 575). If the response is not a configuration-ACK packet, the router resets the internal state of the connection to its previous value (step 580). The router terminates the optimization process and begins the conventional PPP negotiations (step 585). If the response is a configuration-ACK packet, the router determines whether the internal state of the connection is set to 'open' (step 590). The internal state of the connection can be changed as a result of to the re-send timer being expired. If the internal state of the connection is set to 'open', the router discards any further responses (step 595). If the internal state of the connection is not set to 'open', the router sets the internal state of the connection to 'open' (step 597) and discards any further responses (step 595).

An Example Computing and Network Environment

Figure 6:
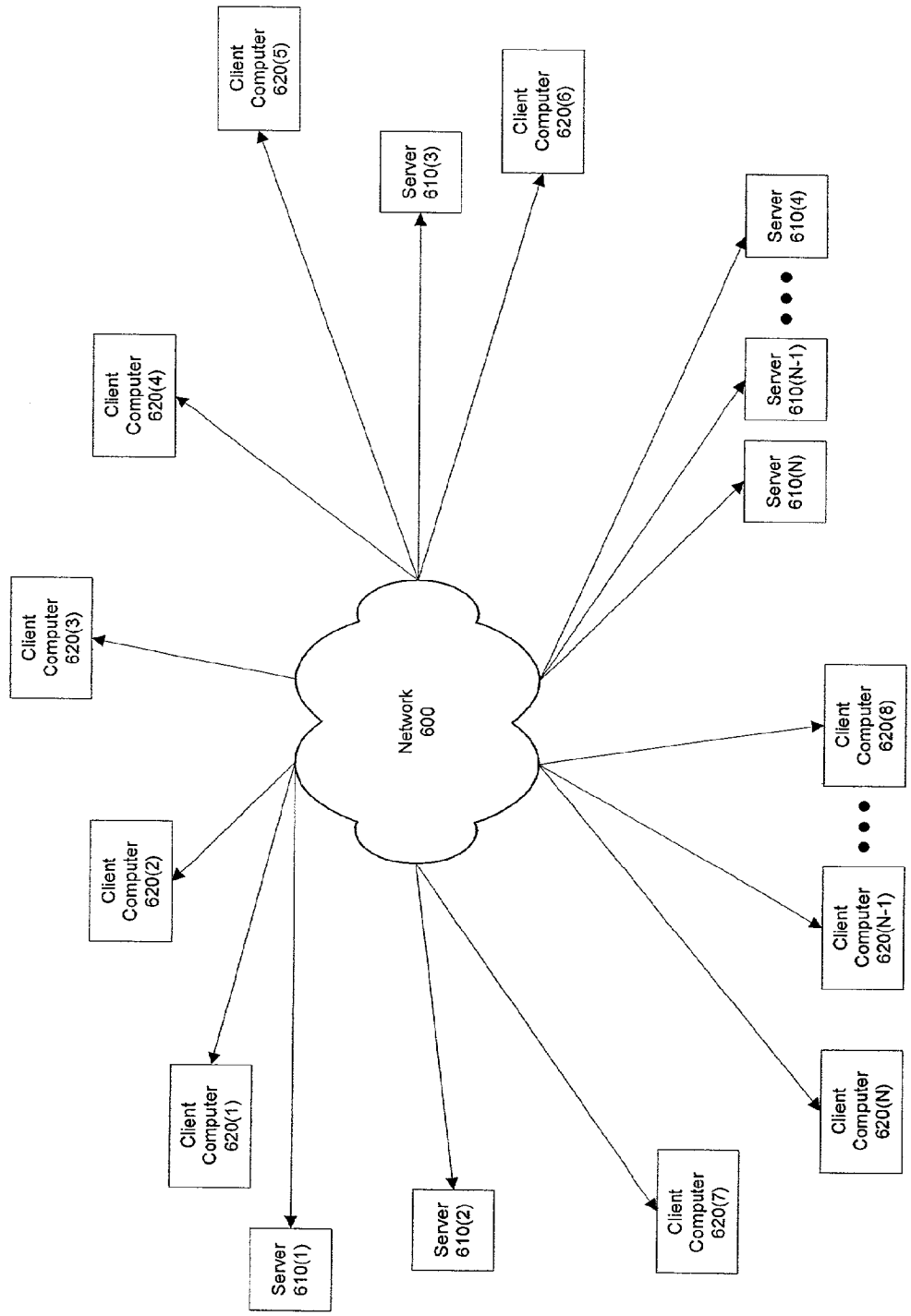
FIG. 6 is a block diagram illustrating a network environment in which commercial transaction processing according to embodiments of the present invention may be practiced.

FIG. 6 is a block diagram illustrating a network environment in which a system according to the present invention may be practiced. As is illustrated in FIG. 6, network 600 (e.g., wide area network, Internet or the like), includes a number of networked servers 610(1)–(N) that are accessible by client computers 620(1)–(N). Communication between client computers 620(1)–(N) and servers 610(1)–(N) typically occurs over a publicly accessible network, such as a public switched telephone network (PSTN), a DSL connection, a cable modem connection or large bandwidth trunks (e.g., communications channels providing T1, OC3 service or the like). Client computers 620(1)–(N) access servers 610(1)–(N) (e.g., via service provider, direct dialed connection, local or wide area network or the like). Access is typically had by executing application specific software (e.g., network connection software, a browser or the like) on the given one of client computers 620(1)–(N).

One or more of client computers 620(1)–(N) and/or one or more of servers 610(1)–(N) can be, for example, a computer system of any appropriate design (e.g., a mainframe, a mini-computer, a personal computer system or the like). Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or more peripheral devices which are coupled to the system processor and perform specialized functions (e.g., modems, sound and video devices, specialized communication devices and the like). Mass storage devices (e.g., hard disks, CD-ROM drives, magneto-optical drives and the like) can also be provided either as an integrated or peripheral device. One such example computer system, discussed in terms of client computers 620(1)–(N) is shown in detail in FIG. 7.

It will be noted that the variable identifier "N" is used in several instances in FIG. 6 to more simply designate the final element (e.g., servers 610(1)–(N) and client computers 620(1)–(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 7:
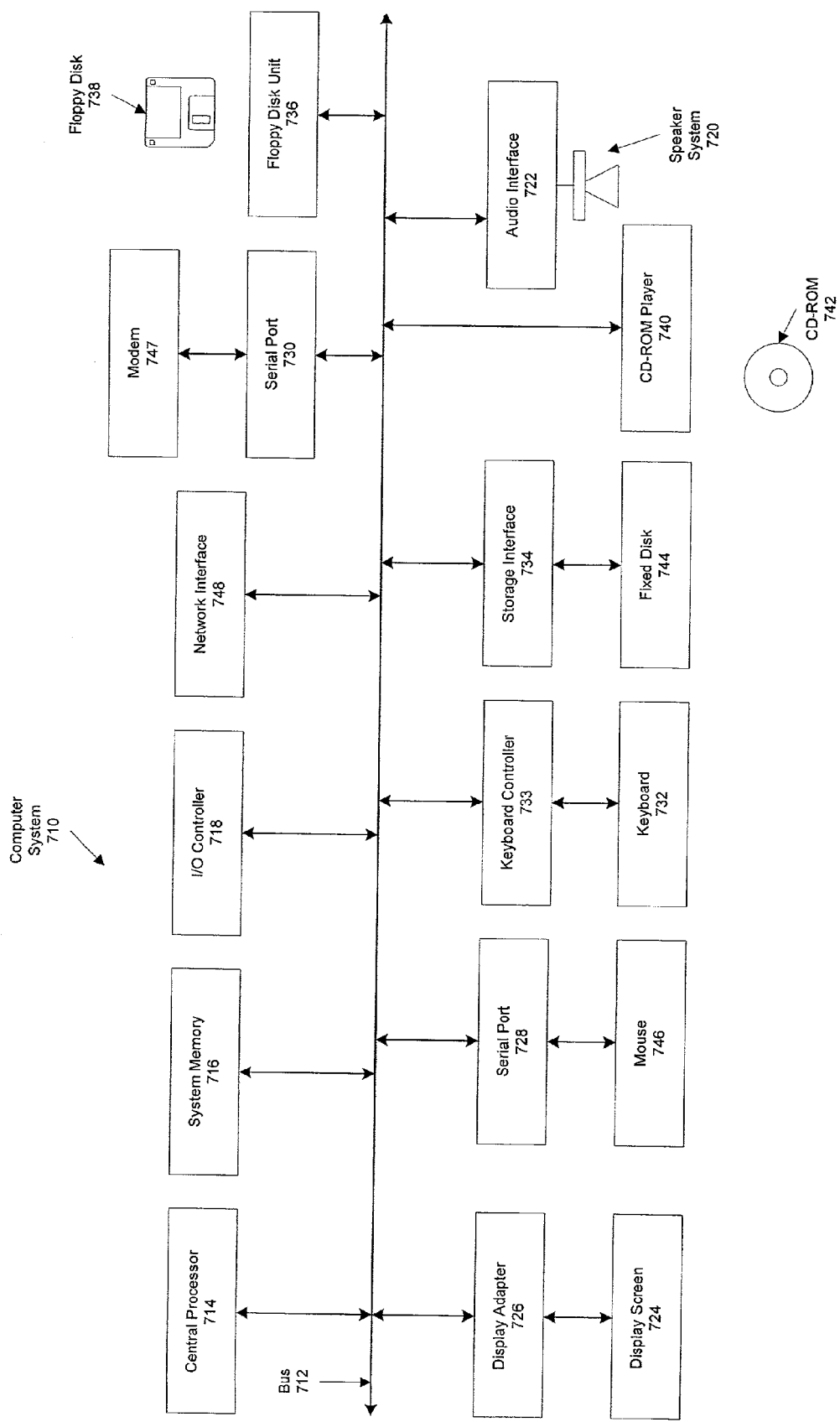
FIG. 7 is a block diagram illustrating a computer system suitable for implementing embodiments of the present invention.

FIG. 7 depicts a block diagram of a computer system 710 suitable for implementing the present invention, and example of one or more of client computers 620(1)–(N). Computer system 710 includes a bus 712 which interconnects major subsystems of computer system 710 such as a central processor 714, a system memory 716 (e.g., RAM, ROM, flash RAM, content-addressable memory, or the like), an input/output controller 718, an external audio device such as a speaker system 720 via an audio output interface 722, an external device such as a display screen 724 via display adapter 726, serial ports (e.g., serial ports 728 and 730), a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include read only memory (ROM), flash memory, content-addressable memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or network interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 provides a connection to a remote server (e.g., via a telephone link, an internet service provider (ISP), local or wide area networks or the like). Network interface 748 may provide a direct connection to a remote server via a direct network link to the Internet (e.g., via a point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
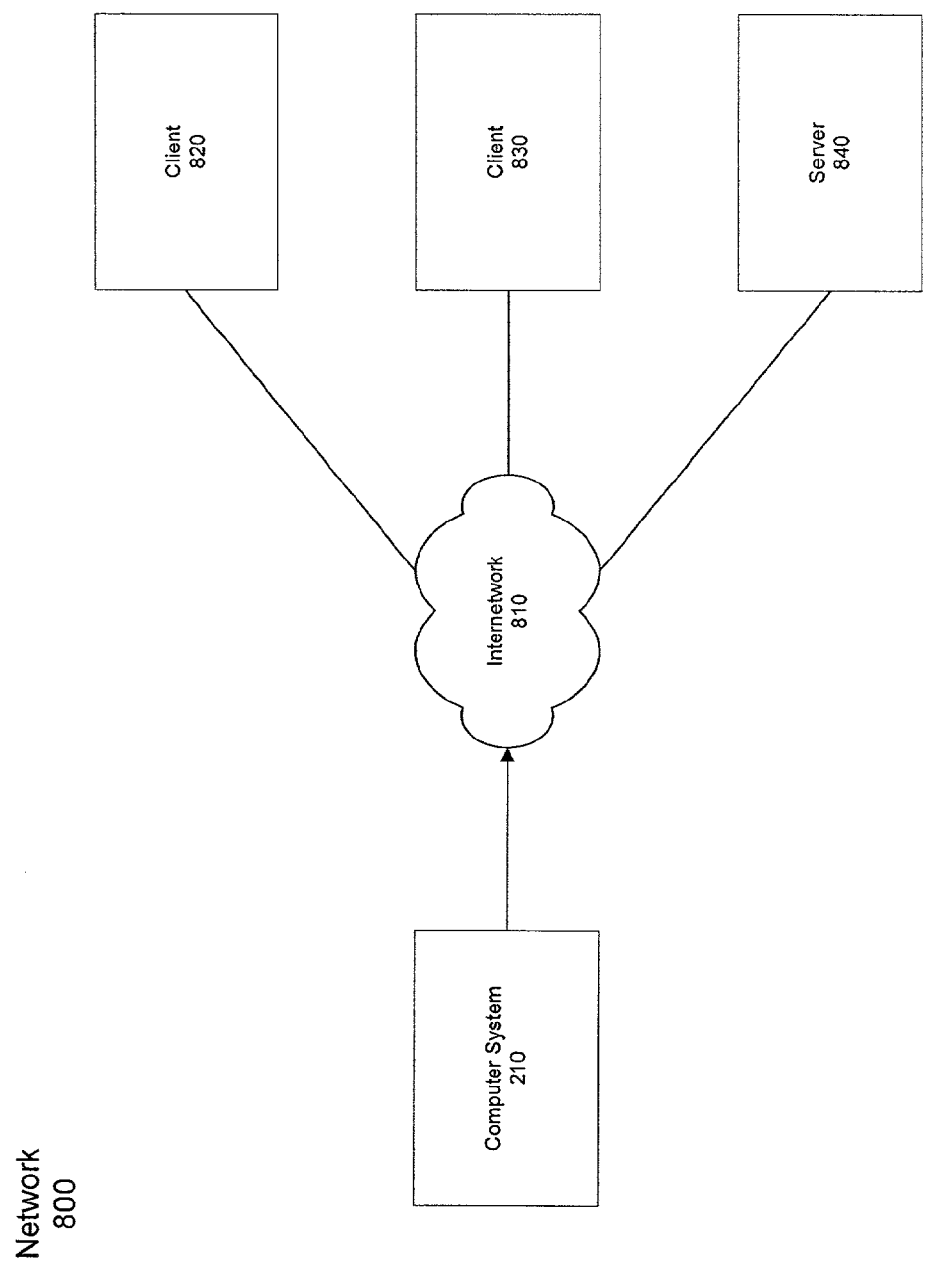
FIG. 8 is a block diagram illustrating the interconnection of the computer system of FIG. 7 to client and host systems.

FIG. 8 is a block diagram depicting a network 800 in which computer system 710 is coupled to an internetwork 810, which is coupled, in turn, to client systems 820 and 830, as well as a server 840. Internetwork 810 (e.g., the Internet) is also capable of coupling client systems 820 and 830, and server 840 to one another. With reference to computer system 710, modem 747, network interface 748 or some other method can be used to provide connectivity from computer system 710 to internetwork 810. Computer system 710, client system 820 and client system 830 are able to access information on server 840 using, for example, a web browser (not shown). Such a web browser allows computer system 710, as well as client systems 820 and 830, to access data on server 840 representing the pages of a website hosted on server 840. Protocols for exchanging data via the Internet are well known to those skilled in the art. Although FIG. 8 depicts the use of the Internet for exchanging data, the present invention is not limited to the Internet or any particular network-based environment.

Referring to FIGS. 6, 7 and 8, a browser running on computer system 710 employs a TCP/IP connection to pass a request to server 840, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of negotiating point-to-point protocol (PPP), the method comprising:
   receiving a first configuration request packet at a first network element for a network connection from a second network element;
   responding with a first packet;
   determining whether said first network element expects said second network element to send a first response to said first packet; and
   if said first response to said first packet is expected by said first network element, determining expected contents of said first response, and
      if said expected contents of said first response to said first packet require a response,
         responding with a second packet before receiving said first response.

2. The method of claim 1, further comprising:
   sending a second configuration request packet to said second network element.

3. The method of claim 1, further comprising:
   if said first configuration request packet includes at least one unsupported option, responding with a configuration reject packet.

4. The method of claim 3, further comprising:
   if said first configuration request packet includes at least one supported option having at least one unsupported value,
      responding with at least one configuration-NAK packet for said supported option having at least one unsupported value.

5. The method of claim 4, wherein said configuration-NAK packet includes at least one suggested supported value for said supported option having at least one unsupported value.

6. The method of claim 5, further comprising:
   responding with a first configuration-ACK packet having said supported option with said suggested supported value before receiving a response to said configuration-NAK packet.

7. The method of claim 6, further comprising:
   starting a re-send timer.

8. The method of claim 7, wherein a value of said re-send timer is dynamically determined according to a network traffic condition.

9. The method of claim 8, further comprising:
   if said re-send timer expires before a response to said second configuration request packet is received,
      re-sending said first configuration-ACK packet,
      restarting said re-send timer, and
      repeating said steps of re-sending and restarting until said response to said second configuration request packet is received.

10. The method of claim 9, further comprising:
    if said response to said second configuration request packet is received, analyzing said response to said second configuration request packet.

11. The method of claim 10, further comprising:
    if said response to said second configuration request packet is a second configuration-ACK packet,
       setting said state of said network connection to 'open', and
       discarding any further responses.

12. The method of claim 10, further comprising:
    if said response to said second configuration request packet is not a second configuration-ACK packet,
       resetting said state of said network connection, and
       initiating conventional PPP negotiation.

13. The method of claim 7, further comprising:
    setting a state of said network connection to 'ACK-sent' after sending said first configuration-ACK packet.

14. The method of claim 7, further comprising:
    setting a state of said network connection to 'open' after sending said first configuration-ACK packet.

15. The method of claim 14, further comprising:
    if said re-send timer expires before a response to said second configuration request packet is received,
       re-sending said first configuration-ACK packet,
       resetting said state of said network connection to 'ACK-sent',
       restarting said re-send timer, and
       repeating said steps of re-sending and restarting until said response to said second configuration request packet is received.

16. The method of claim 15, further comprising:
    if said response to said second configuration request packet is received, analyzing said response to said second configuration request packet.

17. The method of claim 16, further comprising:
    if said response to said second configuration request packet is said second configuration-ACK packet,
       determining said state of said network connection, and
       if said state of said network connection is not set to 'open', setting said state of said network connection to 'open'.

18. The method of claim 17, further comprising:
    discarding any further responses.

19. The method of claim 16, further comprising:
    if said response to said second configuration request packet is not said second configuration-ACK packet,
       resetting said state of said network connection.

20. A network element comprising:
    means for receiving a first configuration request packet at a first network element for a network connection from a second network element;
    means for responding with a first packet;
    means for determining whether said first network element expects said second network element to send a first response to said first packet;
    means for determining expected contents of said first response if said first response to said first packet is expected by said first network element; and
    means for responding with a second packet before receiving said first response if said expected contents of said first response to said first packet require a response.

21. The network element of claim 20, further comprising:
    means for sending a second configuration request packet to said second network element.

22. The network element of claim 20, further comprising:
    means for responding with a configuration reject packet if said first configuration request packet includes at least one unsupported option.

23. The network element of claim 22, further comprising:
    means for responding with at least one configuration-NAK packet for said supported option having at least one unsupported value if said first configuration request packet includes at least one supported option having at least one unsupported value.

24. The network element of claim 23, wherein said configuration-NAK packet includes at least one suggested supported value for said supported option having at least one unsupported value.

25. The network element of claim 24, further comprising:
means for responding with a first configuration-ACK packet having said supported option with said suggested supported value before receiving a response to said configuration-NAK packet.

26. The network element of claim 25, further comprising:
means for starting a re-send timer.

27. The network element of claim 26, wherein a value of said re-send timer is dynamically determined according to a network traffic condition.

28. The network element of claim 27, further comprising:
means for re-sending said first configuration-ACK packet if said re-send timer expires before a response to said second configuration request packet is received;
means for restarting said re-send timer if said re-send timer expires before a response to said second configuration request packet is received; and
means for repeating said steps of re-sending and restarting until said response to said second configuration request packet is received if said re-send timer expires before a response to said second configuration request packet is received.

29. The network element of claim 28, further comprising:
means for analyzing said response to said second configuration request packet if said response to said second configuration request packet is received.

30. The network element of claim 29, further comprising:
means for setting said state of said network connection to 'open' if said response to said second configuration request packet is a second configuration-ACK packet; and
means for discarding any further responses if said response to said second configuration request packet is a second configuration-ACK packet.

31. The network element of claim 29, further comprising:
means for resetting said state of said network connection if said response to said second configuration request packet is not a second configuration-ACK packet; and
means for initiating conventional PPP negotiation if said response to said second configuration request packet is not said second configuration-ACK packet.

32. The network element of claim 26, further comprising:
means for setting a state of said network connection to 'ACK-sent' after sending said first configuration-ACK packet.

33. The network element of claim 26, further comprising:
means for setting a state of said network connection to 'open' after sending said first configuration-ACK packet.

34. The network element of claim 33, further comprising:
means for re-sending said first configuration-ACK packet if said re-send timer expires before a response to said second configuration request packet is received;
means for resetting said state of said network connection to 'ACK-sent' if said re-send timer expires before said response to said second configuration request packet is received;
means for restarting said re-send timer if said re-send timer expires before said response to said second configuration request packet is received; and
means for repeating said steps of re-sending and restarting until said response to said second configuration request packet is received if said re-send timer expires before said response to said second configuration request packet is received.

35. The network element of claim 34, further comprising:
means for analyzing said response to said second configuration request packet if said response to said second configuration request packet is received.

36. The network element of claim 35, further comprising:
means for determining said state of said network connection if said response to said second configuration request packet is said second configuration-ACK packet; and
means for setting said state of said network connection to 'open' if said state of said network connection is not set to 'open'.

37. The network element of claim 36, further comprising:
means for discarding any further responses.

38. The network element of claim 35, further comprising:
means for resetting said state of said network connection if said response to said second configuration request packet is not said second configuration-ACK packet.

39. A network element comprising:
a processor; and
a network interface coupled to said processor, wherein said processor is configured to
receive a first configuration request packet at a first network element for a network connection from a second network element,
respond with a first packet,
determine whether said first network element expects said second network element to send a first response to said first packet, and
if said first response to said first packet is expected by said first network element,
determine expected contents of said first response, and
if said expected contents of said first response to said first packet require a response,
respond with a second packet before receiving said first response.

40. The network element of claim 39, wherein said processor is further configured to
sending a second configuration request packet to said second network element.

41. The network element of claim 39, wherein said processor is further configured to
respond with a configuration reject packet if said first configuration request packet includes at least one unsupported option.

42. The network element of claim 41, wherein said processor is further configured to
respond with at least one configuration-NAK packet for said supported option having at least one unsupported value if said first configuration request packet includes at least one supported option having at least one unsupported value.

43. The network element of claim 42, wherein said configuration-NAK packet includes at least one suggested supported value for said supported option having at least one unsupported value.

44. The network element of claim 43, wherein said processor is further configured to
respond with a first configuration-ACK packet having said supported option with said suggested supported value before receiving a response to said configuration-NAK packet.

45. The network element of claim 44, wherein said processor is further configured to
start a re-send timer.

46. The network element of claim 45, wherein a value of said re-send timer is dynamically determined according to a network traffic condition.

47. The network element of claim 46, wherein said processor is further configured to
re-send said first configuration-ACK packet if said re-send timer expires before a response to said second configuration request packet is received;
restart said re-send timer if said re-send timer expires before a response to said second configuration request packet is received; and
repeat said steps of re-sending and restarting until said response to said second configuration request packet is received if said re-send timer expires before a response to said second configuration request packet is received.

48. The network element of claim 47, wherein said processor is further configured to
analyze said response to said second configuration request packet if said response to said second configuration request packet is received.

49. The network element of claim 48, wherein said processor is further configured to
set said state of said network connection to 'open' if said response to said second configuration request packet is a second configuration-ACK packet; and
discard any further responses if said response to said second configuration request packet is a second configuration-ACK packet.

50. The network element of claim 48, wherein said processor is further configured to
reset said state of said network connection if said response to said second configuration request packet is not a second configuration-ACK packet; and
initiate conventional PPP negotiation if said response to said second configuration request packet is not said second configuration-ACK packet.

51. The network element of claim 45, wherein said processor is further configured to
set a state of said network connection to 'ACK-sent' after sending said first configuration-ACK packet.

52. The network element of claim 45, wherein said processor is further configured to
set a state of said network connection to 'open' after sending said first configuration-ACK packet.

53. The network element of claim 52, wherein said processor is further configured to
re-send said first configuration-ACK packet if said re-send timer expires before a response to said second configuration request packet is received;
reset said state of said network connection to 'ACK-sent' if said re-send timer expires before said response to said second configuration request packet is received;
restart said re-send timer if said re-send timer expires before said response to said second configuration request packet is received; and
repeat said steps of re-sending and restarting until said response to said second configuration request packet is received if said re-send timer expires before said response to said second configuration request packet is received.

54. The network element of claim 53, wherein said processor is further configured to
analyze said response to said second configuration request packet if said response to said second configuration request packet is received.

55. The network element of claim 54, wherein said processor is further configured to
determine said state of said network connection if said response to said second configuration request packet is said second configuration-ACK packet; and
set said state of said network connection to 'open' if said state of said network connection is not set to 'open'.

56. The network element of claim 55, wherein said processor is further configured to
discard any further responses.

57. The network element of claim 54, wherein said processor is further configured to
reset said state of said network connection if said response to said second configuration request packet is not said second configuration-ACK packet.

58. A computer program product for negotiating point-to-point protocol (PPP), encoded in computer readable media, said program product comprising a set of instructions executable on a computer system, wherein said set of instructions configured to
receive a first configuration request packet at a first network element for a network connection from a second network element;
respond with a first packet;
determine whether said first network element expects said second network element to send a first response to said first packet, and
if said first response to said first packet is expected by said first network element, determine expected contents of said first response, and
if said expected contents of said first response to said first packet require a response,
respond with a second packet before receiving said first response.

59. The computer program product of claim 58, wherein said set of instructions is further configured to
send a second configuration request packet to said second network element.

60. The computer program product of claim 58, wherein said set of instructions is further configured to
if said first configuration request packet includes at least one unsupported option, respond with a configuration reject packet.

61. The computer program product of claim 60, wherein said set of instructions is further configured to
if said first configuration request packet includes at least one supported option having at least one unsupported value,
respond with at least one configuration-NAK packet for said supported option having at least one unsupported value.

62. The computer program product of claim 61, wherein said configuration-NAK packet includes at least one suggested supported value for said supported option having at least one unsupported value.

63. The computer program product of claim 62, wherein said set of instructions is further configured to
respond with a first configuration-ACK packet having said supported option with said suggested supported value before receiving a response to said configuration-NAK packet.

64. The computer program product of claim 63, wherein said set of instructions is further configured to
   start a re-send timer.

65. The computer program product of claim 64, wherein a value of said re-send timer is dynamically determined according to a network traffic condition.

66. The computer program product of claim 65, wherein said set of instructions is further configured to
   if said re-send timer expires before a response to said second configuration request packet is received,
      re-send said first configuration-ACK packet,
      restart said re-send timer, and
      repeat said steps of re-sending and restarting until said response to said second configuration request packet is received.

67. The computer program product of claim 66, wherein said set of instructions is further configured to
   if said response to said second configuration request packet is received, analyze said response to said second configuration request packet.

68. The computer program product of claim 67, wherein said set of instructions is further configured to
   if said response to said second configuration request packet is a second configuration-ACK packet,
      set said state of said network connection to 'open', and
      discard any further responses.

69. The computer program product of claim 67, wherein said set of instructions is further configured to
   if said response to said second configuration request packet is not a second configuration-ACK packet,
      reset said state of said network connection, and
      initiate conventional PPP negotiation.

70. The computer program product of claim 64, wherein said set of instructions is further configured to
   set a state of said network connection to 'ACK-sent' after sending said first configuration-ACK packet.

71. The computer program product of claim 64, wherein said set of instructions is further configured to
   set a state of said network connection to 'open' after sending said first configuration-ACK packet.

72. The computer program product of claim 71, wherein said set of instructions is further configured to
   if said re-send timer expires before a response to said second configuration request packet is received,
      re-send said first configuration-ACK packet,
      reset said state of said network connection to 'ACK-sent',
      restart said re-send timer, and
      repeat said steps of re-sending and restarting until said response to said second configuration request packet is received.

73. The computer program product of claim 72, wherein said set of instructions is further configured to
   if said response to said second configuration request packet is received, analyze said response to said second configuration request packet.

74. The computer program product of claim 73, wherein said set of instructions is further configured to
   if said response to said second configuration request packet is said second configuration-ACK packet,
      determine said state of said network connection, and
      if said state of said network connection is not set to 'open',
         set said state of said network connection to 'open'.

75. The computer program product of claim 74, wherein said set of instructions is further configured to
   discard any further responses.

76. The computer program product of claim 73, wherein said set of instructions is further configured to
   if said response to said second configuration request packet is not said second configuration-ACK packet,
      reset said state of said network connection.

* * * * *